United States Patent [19]

Metheny

[11] Patent Number: 5,040,818
[45] Date of Patent: Aug. 20, 1991

[54] VEHICULAR SNOW SKI

[75] Inventor: Kevin W. Metheny, Carroll County, Ind.

[73] Assignee: Ultimate Sports Incorporated, West Lafayette, Ind.

[21] Appl. No.: 462,826

[22] Filed: Jan. 10, 1990

[51] Int. Cl.⁵ ............................................. A63C 5/044
[52] U.S. Cl. ..................... 280/609; 280/21.1; 280/28; 280/602; 280/610
[58] Field of Search ............... 280/602, 601, 610, 845, 280/22, 28, 21.1, 609

[56] References Cited

U.S. PATENT DOCUMENTS

| | | | |
|---|---|---|---|
| 2,038,077 | 4/1936 | Haglund | 280/601 |
| 3,732,939 | 5/1973 | Samson | 280/28 |
| 3,738,676 | 6/1973 | Hand | 280/28 |
| 3,774,926 | 11/1973 | Chase | 280/28 |
| 4,225,147 | 9/1980 | Lowery | 280/87.01 |
| 4,293,968 | 10/1981 | Levine | 9/310 A |
| 4,595,211 | 6/1986 | Fitzpatrick | 280/28 |
| 4,714,206 | 12/1987 | Feichtbauer | 280/604 |
| 4,775,161 | 10/1988 | Bridges | 280/21.1 |
| 4,919,441 | 4/1990 | Marier et al. | 280/21.1 |

FOREIGN PATENT DOCUMENTS 618214 2/1961 Italy .................................. 280/602
1082772 4/1986 Japan ................................ 280/610

Primary Examiner—Andres Kashnikow
Assistant Examiner—Eric Culbreth

[57] ABSTRACT

A vehicular snow ski is disclosed having an ultra high molecular weight polymer material for extended wear and an adjustable curvature tip end. The tip end is adjustable using a variable length turnbuckle for controlling the curvature and tension of the curved tip end. The radius of the curved tip end is changed to meet varying snow conditions encountered by an operator. The under surface of the ski includes a plurality of concave surfaces extending longitudinally therealong for compacting snow and lifting the ski in the snow when moving therein. Two concave surfaces are recessed from a center concave surface to form two vertically oriented steering surfaces for controlling the direction of the ski in opposite directions. A wear bar with carbide inserts extends beyond the center concave surface for running on ice and other hard surfaces. Attached to the top surface is a shoe for mounting the ski to the suspension of a vehicle such as a snowmobile.

26 Claims, 2 Drawing Sheets

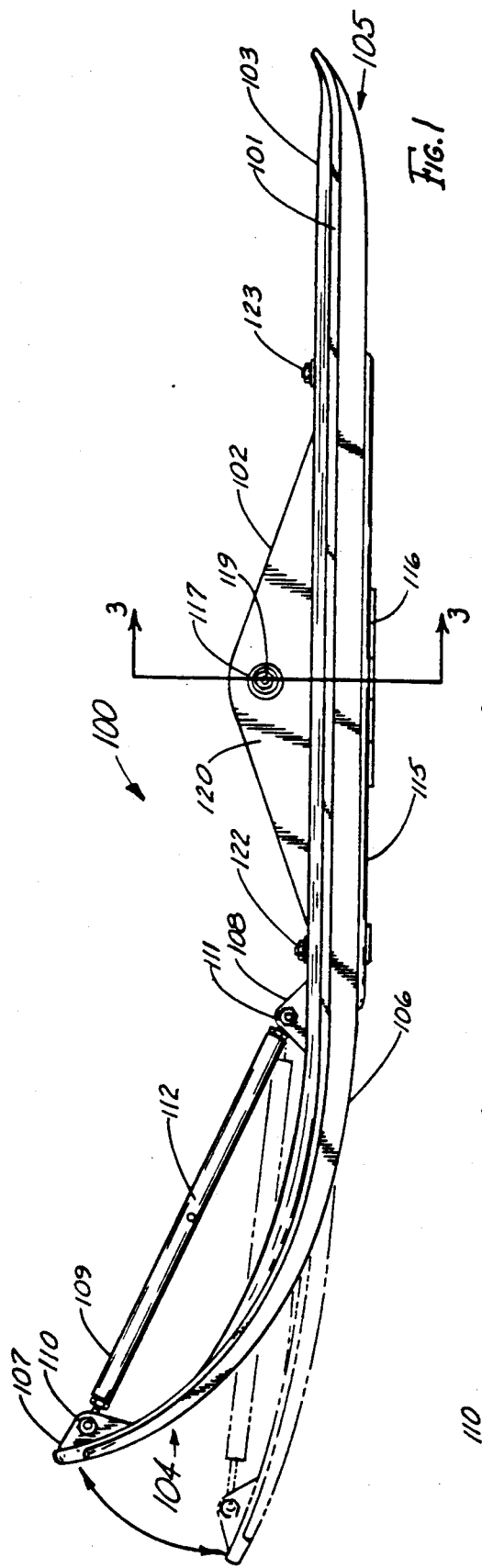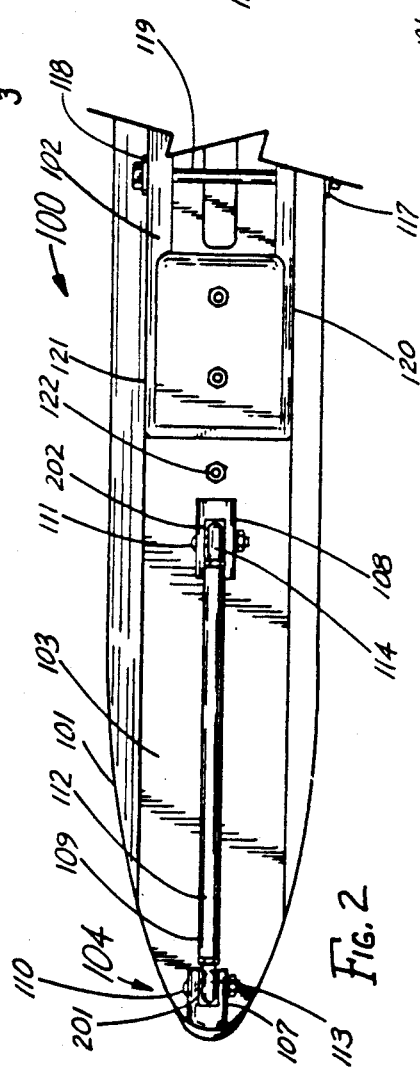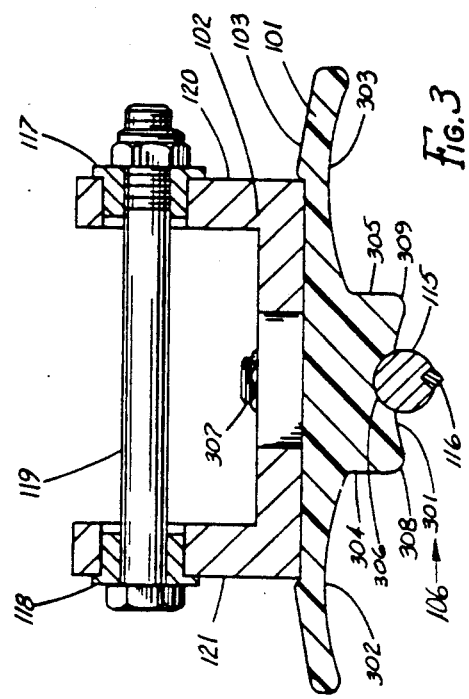

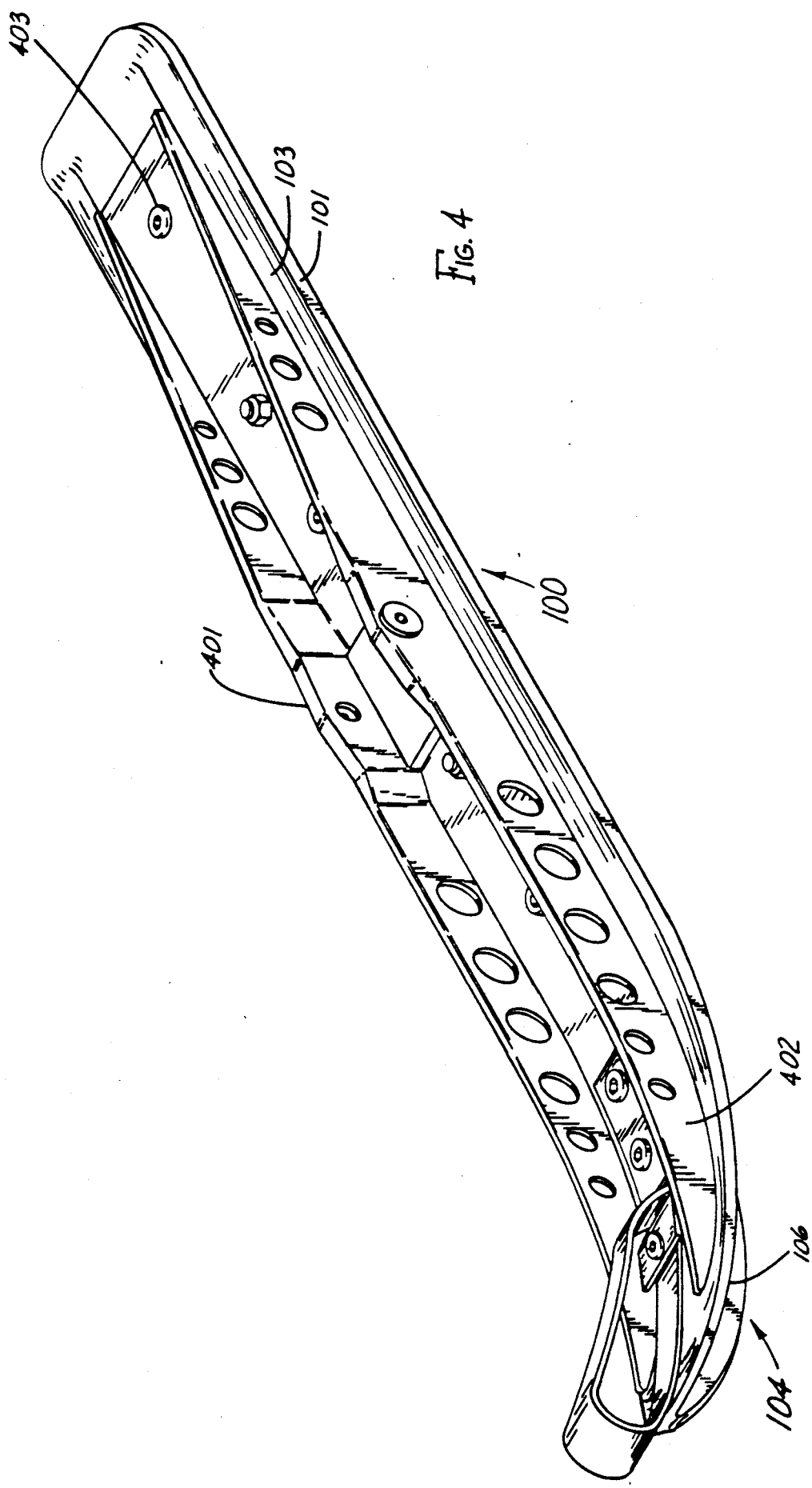

5,040,818

VEHICULAR SNOW SKI

TECHNICAL FIELD

This invention relates to snow skis and particularly to snow skis for use with a vehicle.

BACKGROUND OF THE INVENTION

Snow skis have been utilized for centuries on vehicles such as sleds and sleighs and more recently on all terrain vehicles, airplanes and snowmobiles. Snow skis have been made from materials such as wood, stone, metal and plastic. Presently, original equipment and aftermarket snowmobile skis are fabricated from crude steel or aluminum with painted or anodized finishes. Aluminum skis are lightweight but are not durable enough for all around trail riding. Steel is preferred for snowmobile skis because of manufacturing ease, low cost and short product life. Steel snowmobile skis wear quickly and last for only about 500–1000 miles with rust and corrosion appearing within the first 100 miles. Paint and powder coat finishes chip and flake off due to impact, vibration and abrasive contact. Snow is inherently filled with all types of debris such as rocks, gravel, sand, sticks and a considerable amount of salt due to operation along roadsides and on road surfaces. As the steel ski wears, the induced drag increases the roughness of the under surface with the ski plowing and churning its way through the snow. As a result, performance and fuel efficiency suffers tremendously not to mention the unattractive appearance of the ski.

Under certain snow conditions, the under surface of a snowmobile ski builds up frozen snow and ice thereon. With such an accumulation, the forward progress of the snowmobile is significantly impeded as a result of the increased resistance of the ski to slide over a snow covered surface. In some cases, the build up of snow and ice on the under surface of a snowmobile ski is so great that the forward progress of the vehicle is substantially prevented. One solution to this problem has been the use of a thin flexible strip of smooth plastic which is attached to the under surface of the snowmobile ski. The plastic does not support the buildup of frozen snow and ice and maintains the under surface of the ski free of snow and ice buildup. However, one problem associated with this solution is the rapid wear of the plastic strip. As a result, the plastic under surface strip is used only when temperature and snow conditions are encountered which promote the buildup of frozen snow and ice on the under surface of the snowmobile ski. Not only is the plastic strip subject to rapid wear, but the need for the operator to attach and remove the plastic strip depending on existing snow conditions is both time consuming and annoying.

Another problem associated with vehicular snow skis is the shape of the under surface. Present lateral construction of the under surface of the ski is flat which promotes wear of the under surface over rough terrains. The front end tip of the ski is curled with a fixed curvature for engaging the snow and setting the front suspension of the vehicle. With a fixed curvature, the suspension of the vehicle may be set for one type of snow condition such as shallow or dry hard packed snow but is not adapted for efficient use in deep snow where the progress of the vehicle may be seriously impeded. Typically, the curvature is set in a neutral position which is neither good or bad for any snow condition. However, this neutral position does not provide an optimum setting particularly for high performance or competition applications.

With flat-bottomed snow skis, a longitudinally positioned steering or wear bar has been added to the under surface to provide directional steering of the ski. However, this bar wears as quickly, if not more so, than that of the under surface of the ski with loss of directional control as the steering bar is worn. The longitudinal under surface of the ski has also been formed into a convex or bowed shape to improve steerability, but again the wear at the center of the ski is significantly increased.

SUMMARY OF THE INVENTION

The foregoing problems and disadvantages are solved and a technical advantage is achieved in an illustrative vehicular snow ski having an elongated member with an under surface that includes a concave surface extending longitudinally therealong for compacting snow and lifting the ski in the snow as it travels therethrough. To significantly increase the useful life of the ski, the elongated member is comprised of an ultra high molecular weight polymer material such as an ultra high molecular weight polyethylene material, which has been found experimentally to wear much better than steel. Not only does this material exhibit a better wear characteristic than that of steel but does not corrode or decompose in the presence of various chemicals such as road salts.

The ski further includes a shoe mounted on the top surface of the elongated member for attaching the ski to a vehicle such as a snowmobile.

The under surface further advantageously includes second and third concave surfaces extending longitudinally along the elongated member and lateral to the first concave surface. The second and third concave surfaces are recessed from the first concave surface to advantageously provide first and second steering surfaces. The first steering surface extends between the first and second concave surface and is capable of steering the ski in a first direction. The second steering surface extends between the first and third concave surface and is capable of steering the ski in a second direction opposing that of the first direction. The concave surfaces advantageously compact the snow and lift the ski as it travels through the snow. The two steering surfaces provide directional control in snow. The concave surfaces improve the floatation of the ski particularly in deep powder snow.

To further improve the wear characteristics and steering of the vehicle on surfaces other than snow, a wear bar is mounted on the first concave surface and extends therefrom. The wear bar includes a plurality of inserts such as carbide extending from the under surface for controlling the direction of the ski on ice and surfaces other than snow.

The elongated member also further advantageously includes a tip end having a predetermined curvature for tuning the suspension of a vehicle of which the ski is attached thereto. The predetermined curvature of the tip end is also adjustable to meet the varying conditions of snow such as wet, dry, compact, or powdery. With a larger radius curvature, the ski exhibits more flex and is faster in shallow and wet snow. With a smaller radius of curvature the tip end of the ski is held higher for lifting the snowmobile in deep or powdery snow. The spring tension of the ski is dramatically increased resulting in a firmer ride. The concave under surface and adjustable tip end significantly improve control of the vehicle and safer operation thereof. The ski further includes an adjustable turnbuckle which is attached between the curved tip end and the top surface of the ski for adjusting the curvature of the tip end. A first lug is positioned about the tip end for attaching one end of the turnbuckle, whereas a second lug is positioned on the top surface between the tip and back end of the elongated member for attachment to the other end of the turnbuckle. As the length of the turnbuckle is adjusted the curvature of the tip end is varied to the desired curvature.

The ski further includes a shoe mounted on the top surface of the elongated member for attaching the ski to a vehicle. In one embodiment, the shoe includes a channel extending longitudinally along the top surface of the elongated member for reinforcing the elongated member. In those instances where a predetermined curvature is desired, the channel includes a front end having a predetermined curvature for establishing the curvature of the tip end of the elongated member.

BRIEF DESCRIPTION OF THE DRAWING

FIG. 1 depicts a side view of the vehicular snow ski of the present invention;

FIG. 2 depicts a top view of the tip end of the snow ski of FIG. 1;

FIG. 3 depicts a cross-sectional view of the ski of FIG. 1 along the line 3—3; and FIG. 4 depicts an alternative embodiment of the vehicular snow ski of FIG. 1.

DETAILED DESCRIPTION

Depicted in FIG. 1 is a side view of an illustrative snowmobile ski 100 including an elongated member 101 and a metallic shoe 102 mounted on the top surface 103 of the elongated member for attaching the ski to a vehicle such as a snowmobile. The elongated member is comprised of an ultra high molecular weight polymer material such as TIVAR-100 ultra high molecular weight polyethylene material which is available from the Poly-Hi Menasha Corporation, Fort Wayne, Ind. This ultra high molecular weight polymer material has been found to wear four to five times better than that of steel.

The elongated member 101 has a leading tip end 104 with an adjustable curvature, a trailing back end 105 and an under surface 106 for running in snow and on other surfaces such as ice and the like. Turnbuckle 109 determines the curvature of the tip end. The overall length of the turnbuckle is adjustable by the rotation of center member 112 for variably changing the curvature of the tip end between a fully upright position as shown and a larger radius relaxed position as indicated by the phantom lines of the tip end. Depicted in FIG. 2 is a top view of tip end 104 of the snowmobile ski. As shown in FIGS. 1 and 2, lugs 107 and 108 are positioned on the top surface 103 of the elongated member along a center line thereof. Lug 107 is positioned forward at the curved tip end, whereas second lug 108 is positioned rearward therefrom in front of shoe 102. These lugs are formed with respective slots 201 and 202 in the molding process of the elongated member. The ends of turnbuckle 109 are inserted in the slots and attached between the two lugs using well-known bolts 110 and 111, respectively. The length of turnbuckle 109 is adjusted by turning center member 112 either clockwise or counter clockwise with respect to the right and left hand threaded eye bolts 113 and 114. Adjusting the overall length of the turnbuckle changes the predetermined curvature of the tip end between the fully upright and relaxed positions.

In the relaxed position, the turnbuckle is extended to its longest length for establishing the largest radius curvature of the tip end. This large radius curvature of the tip end allows the ski to run faster in shallow and wet snow. In the fully upright position, the length of turnbuckle 109 has been adjusted to its shortest length for establishing a shorter radius curvature. This shorter radius curvature causes the tip end 104 of the ski to become more vertical. In addition, the tension of the tip end is greater and provides less flex in the suspension of the vehicle. With the curved tip end of the ski in a more vertical position, the tip end more readily lifts the snowmobile when running in deep or powdery snow. The adjustment of the turnbuckle allows the operator to readily adjust and fine tune the suspension of his vehicle according to prevailing snow conditions. This is particularly useful when competing in sport or competition events. The combination of the concave surfaces of the under surface of the ski along with the adjustable tip end allow the operator to transfer large amounts of weight to the back end of the sled or snowmobile for better traction while maintaining easy and surefooted control of the vehicle. In addition, the tracking and directional control is improved significantly along with safer operation of the snowmobile.

Mounted on the top surface 103 of the elongated member just back of second lug 108 is shoe 102. Shoe 102 is a generally U-shaped metallic channel configured as shown with holes drilled in the upwardly extending sides 120 and 121 of the channel for receiving bushings 117 and 118 a connector bolt 119 therein for connecting the ski to the suspension of a snowmobile.

A stainless steel wear bar 115 is mounted on the under surface 106 of elongated member 101 centrally and longitudinally therealong with a plurality of studs and nuts such as 122 and 123. A plurality of carbide inserts 116 are attached to the downwardly extending surface of the wear bar for making contact with ice and other surfaces for controlling the direction of the ski thereon.

Depicted in FIG. 3 is a cross sectional view of the ski of FIG. 1 along the line 3—3. The under surface 106 of elongated member 101 comprises three concave surfaces 301–303. Concave surface 301 extends longitudinally and centrally along the under surface of the elongated member. Second and third concave surfaces 302 and 303 also extend longitudinally along the under surface 106 of the elongated member lateral to concave surface 301 and recessed therefrom as shown. These longitudinal concave surfaces compact the snow as the ski moves along therein and lifts the ski in the snow as the ski travels therein. Under surface 106 also includes steering surfaces 304 and 305 which extend vertically between the first concave surface and the two lateral concave surfaces 302 and 303. Steering surface 304 extends between concave surface 301 and 302 and is utilized as a thrust surface for changing the direction of the ski in one direction. Steering surface 305 extends between concave surface 301 and 303 is similarly used as a thrust surface for changing the direction of the ski as it moves in snow in a second direction generally opposing that of the first direction.

Extending longitudinally in first concave surface 301 is semi-circular surface 306 for receiving stainless steel wear bar 115. Stainless steel wear bar 115 is mounted to the elongated member with a plurality studs extending vertically through the ultra high molecular weight polyethylene material to the top surface 103 of the member. Fasteners again such as nut 307 fixedly positioned the wear bar and shoe 102 to the elongated member. Wear bar 115 extends downwardly from first concave surface 301 for making contact on surfaces other than snow such as ice and the like. The plurality of carbide inserts 116 extend downwardly from the wear bar for providing a pointed contact surface for reducing friction and wear on these hardened surfaces. Edges 308 and 309 formed by steering surfaces 304 and 305 and first concave surface 301 are utilized for providing a pointed contact surface for running on softer surfaces such as mud and dirt.

Depicted in FIG. 4 is a pictorial view of snowmobile ski 100 with shoe 401 which is an alternative embodiment of shoe 102. In this embodiment, the elongated member 101 of the ski has had lugs 107 and 108 removed. Shoe 401 is also a generally U-shaped metallic channel extending almost the entire length of the top surface 103 of the elongated member. The extended channel reinforces the elongated member and has a curved tip end 402 for establishing a predetermined curvature to the tip end 104 of the elongated member. The shoe, also commonly referred to as a strongback, is cast from a metal material such as ALMAG 35 to form the desired U-shaped channel and the curvature at the tip end. The shoe is attached to the elongated member using a plurality of fasteners such as buttonhead x-socket cap screws 403 along with the studs and self-locking nuts from the wear bar attached to the under surface 106 of the elongated member. Although not as adjustable as the first embodiment as far as varying snow or surface conditions are concerned, the reinforced structure of the elongated member provides significant durability in heavy-duty utility applications.

It is to be understood that the above-described vehicular snow ski is merely an illustrative embodiment of the principles of this invention and the numerous other vehicular snow skis may be devised by those skilled in the art without departing from the spirit and scope of the invention. In particular, the elongated member may be formed of other ultra high molecular weight materials which are flexible and wear better than steel. The curvature of the curved tip end of the ski may also be varied by other variable length or tension assemblies for adjusting the curvature of the curved tip end. The length and shape of the shoe may also be varied to accommodate various sport or utility applications.

What is claimed is:

1. A vehicular snow ski comprising:
an elongated member having a top surface and an under surface, said under surface including a concave surface, a second concave surface, and a first steering surface extending longitudinally along said elongated member, said first and second concave surfaces being adjacent and facing downwardly, said first steering surface facing laterally to one side of said elongated member and extending between said first and second concave surfaces, one of said first and second surfaces being at least partially recessed from the other; and
a shoe on said top surface of said elongated member for attachment to a vehicle.

2. The ski of claim 1 wherein all of said second concave surface longitudinally along said elongated member extends laterally to one side of and is at least partially recessed from said first concave surface.

3. The ski of claim 2 wherein said first steering surface extends vertically between said first and second concave surfaces for steering said ski in a first direction.

4. The ski of claim 2 wherein said under surface includes a third concave surface extending longitudinally along said elongated member and laterally to another side of said first concave surface, all of said third concave surface being at least partially recessed from said first concave surface.

5. The ski of claim 4 wherein said under surface includes a second steering surface facing laterally to another side of said elongated member and extending longitudinally along said elongated member and between said first and third concave surfaces for steering said ski in a second direction.

6. The ski of claim 4 wherein said third concave surface is entirely recessed from said first concave surface.

7. The ski of claim 1 further comprising a wear bar mounted on said first concave surface and extending therefrom.

8. The ski of claim 7 wherein said wear bar includes a plurality of inserts extending away from said under surface for controlling the direction of said ski on ice and surfaces other than snow.

9. The ski of claim 1 wherein said elongated member includes a tip end having a predetermined curvature and wherein said ski further includes a turnbuckle attached to said tip end and said top surface between said tip end and a back end of said elongated member, said turnbuckle establishing and having an adjustable length for changing said predetermined curvature of said tip end.

10. The ski of claim 9 wherein said top surface includes a first lug positioned about said tip end and a second lug positioned between said tip end and said back end, the ends of said turnbuckle being attached to said first and second lugs, respectively.

11. The ski of claim 1 wherein said elongated member comprises an ultra high molecular weight polymer material.

12. A vehicular snow ski comprising:
an elongate member of an ultrahigh molecular weight polymer material and having a top surface for mounting a shoe thereon and an under surface having first, second, and third concave surfaces extending longitudinally along said undersurface, said second and third concave surfaces being positioned laterally on opposite sides of said first concave surface, all of said second and third concave surfaces being at least partially recessed from said first concave surface.

13. The ski of claim 12 wherein said top surface includes a first lug positioned about a tip end of said elongated member and a second lug positioned between said tip end and a back end of said elongated member.

14. The ski of claim 13 further comprising a turnbuckle having first and second ends connected to said first and second lugs, respectively, and an adjustable length for establishing a predetermined curvature to said tip end.

15. The ski of claim 12 wherein said under surface further includes a first steering surface facing laterally to one side of said elongated member and extending between said first and second concave surfaces and a second steering surface facing laterally to another side of said elongated member and extending between said first and third concave surfaces.

16. A snow ski for use with a vehicle comprising:
   elongated means having first, second, and third concave under surfaces facing downwardly and extending longitudinally therealong and a first steering surface facing laterally to one side of said elongated means and extending between said first and second concave under surfaces for turning said ski in a first direction, said first concave surface being centrally positioned between said second and third concave surfaces, all of said second and third concave surfaces being at least partially recessed from said first concave surface; and
   shoe means about a top surface of said elongated means for attaching said ski to said vehicle.

17. The ski of claim 16 wherein said elongated means includes a second steering surface facing laterally to another side of said elongated means and extending between said first and third concave under surfaces for turning said ski in a second direction.

18. The snow ski of claim 16 further comprising wear means attached to and extending beyond said first concave surface for running on a surface other than said snow.

19. The snow ski of claim 18 wherein said wear means includes carbide inserts for running on said surface other than said snow.

20. The snow ski of claim 16 wherein said first concave under surface includes edge means for running on a surface other than snow.

21. The snow ski of claim 16 wherein said elongated means includes a tip end having a predetermined curvature.

22. The snow ski of claim 21 further comprising adjustable means having a first end connected to said tip end and a second end connected to said elongated means between said tip end and a back end of said elongated means for establishing said predetermined curvature.

23. The snow ski of claim 16 wherein said shoe means includes channel means extending longitudinally along a top surface of said elongated means for reinforcing said elongated means.

24. The snow ski of claim 23 wherein said channel means includes curved end means for establishing a predetermined curvature to a tip end of said elongated means.

25. The snow ski of claim 16 wherein said elongated means comprises an ultra high molecular weight polymer material.

26. A snowmobile ski comprising:
   an elongated member comprising an ultra high molecular weight polyethylene material and having a top surface, an under surface, a tip end having a predetermined curvature, and a back end, said under surface having a first concave surface extending longitudinally along said elongated member for compacting snow and also having second and third concave surface extending longitudinally along said elongated member and laterally to said first concave surface, all of said second and third surfaces being entirely recessed from said first concave surface, said under surface further having first and second steering surfaces extending vertically and respectively from said second and third concave surfaces to said first concave surface for steering said ski in respective first and second directions, said top surface including first and second lugs about said tip end and between said tip end and said back end;
   a turnbuckle having first and second ends connected to said first and second lugs, said turnbuckle having a length for determining said predetermined curvature of said tip end, said length being adjustable for changing said predetermined curvature;
   a wear bar mounted on said first concave surface and extending therefrom, said wear bar including a plurality of inserts extending away from said under surface for controlling the direction of said ski on ice and surfaces other than said snow; and
   a shoe mounted on said top surface of said elongated member and having a connector for attaching said ski to a snowmobile.

* * * * *